United States Patent
Bensberg et al.

(10) Patent No.: US 11,947,823 B2
(45) Date of Patent: *Apr. 2, 2024

(54) SYSTEM AND METHODS FOR PROVIDING A MEMORY SLICE DATA STRUCTURE FOR USE WITH DIVERSE MEMORY AND STORAGE MEDIA

(71) Applicant: SAP SE, Walldorf (DE)

(72) Inventors: Christian Bensberg, Heidelberg (DE); Steffen Geissinger, Wiesloch (DE)

(73) Assignee: SAP SE, Walldorf (DE)

( * ) Notice: Subject to any disclaimer, the term of this patent is extended or adjusted under 35 U.S.C. 154(b) by 53 days.

This patent is subject to a terminal disclaimer.

(21) Appl. No.: 17/750,900

(22) Filed: May 23, 2022

(65) Prior Publication Data

US 2022/0283723 A1    Sep. 8, 2022

Related U.S. Application Data

(63) Continuation of application No. 15/972,467, filed on May 7, 2018, now Pat. No. 11,372,571.

(51) Int. Cl.
*G06F 3/06*     (2006.01)
*G06F 16/22*    (2019.01)
(Continued)

(52) U.S. Cl.
CPC .......... *G06F 3/0644* (2013.01); *G06F 3/0604* (2013.01); *G06F 3/064* (2013.01);
(Continued)

(58) Field of Classification Search
CPC ............. G06F 16/2282; G06F 16/2308; G06F 16/236; G06F 16/2379; G06F 16/2455;
(Continued)

(56) References Cited

U.S. PATENT DOCUMENTS 6,253,300 B1    6/2001  Lawrence et al.
7,895,164 B1 *  2/2011  Varadarajan ........ G06F 11/1438
                                                     707/649

(Continued)

OTHER PUBLICATIONS 892 dated Apr. 6, 2020 which was issued in connection with U.S. Appl. No. 15/972,467.
(Continued)

*Primary Examiner* — William E. Baughman
(74) *Attorney, Agent, or Firm* — Buckley, Maschoff & Talwalkar LLC

(57) ABSTRACT

A data storage and retrieval system for a computer memory including a memory slice formed of segments and adapted to contain one or more documents and a checkpoint adapted to persist the memory slice. The checkpoint includes a document vector containing a document pointer corresponding to a document. The document pointer including a segment identifier identifying a logical segment of the memory slice and an offset value defining a relative memory location of the first document within the identified segment. There are checkpoint memory blocks, each storing a copy of a corresponding segment of the memory slice. The segment identifier of the document pointer identifies a checkpoint memory block and the offset value of the document pointer defines a relative location of the document within the checkpoint memory block.

20 Claims, 15 Drawing Sheets

(51) Int. Cl.
*G06F 16/23* (2019.01)
*G06F 16/2455* (2019.01)

(52) U.S. Cl.
CPC ........ *G06F 3/0673* (2013.01); *G06F 16/2282* (2019.01); *G06F 16/2308* (2019.01); *G06F 16/2379* (2019.01); *G06F 16/2455* (2019.01)

(58) Field of Classification Search
CPC ........ G06F 16/93; G06F 3/0604; G06F 3/064; G06F 3/0644; G06F 3/0673
See application file for complete search history.

(56) References Cited

U.S. PATENT DOCUMENTS

| | | | |
|---|---|---|---|
| 8,229,730 | B2 | 7/2012 | Van Den Berg et al. |
| 8,316,036 | B2 | 11/2012 | Walters et al. |
| 11,372,571 | B2* | 6/2022 | Bensberg ............ G06F 16/2282 |
| 2006/0184587 | A1 | 8/2006 | Federwisch et al. |
| 2008/0222219 | A1 | 9/2008 | Varadarajan |
| 2011/0179085 | A1 | 7/2011 | Hammerschmidt et al. |
| 2011/0302189 | A1 | 12/2011 | Liu et al. |
| 2014/0172912 | A1 | 6/2014 | Morris |
| 2015/0088924 | A1 | 3/2015 | Abadi et al. |
| 2015/0120687 | A1 | 4/2015 | Bhattacharjee et al. |
| 2017/0031614 | A1 | 2/2017 | Katiyar et al. |
| 2017/0052717 | A1* | 2/2017 | Rawat ................. G06F 16/2246 |
| 2017/0161151 | A1 | 6/2017 | Jacques Da Silva et al. |
| 2018/0137144 | A1* | 5/2018 | Geissinger .......... G06F 16/2379 |
| 2019/0179948 | A1 | 6/2019 | Benjamin-Deckert et al. |
| 2019/0213080 | A1 | 7/2019 | Alluboyina et al. |
| 2019/0236168 | A1* | 8/2019 | Vaswani ............. G06F 16/2455 |

OTHER PUBLICATIONS

W3Schools; "MySQL What is DDL, DML and DCL?;" Aug. 29, 2015; available at: https://www.w3schools.in/mysql/ddl-dml-dcl/.

Tiffany, Rob; "SOL Server CE Database Development with the .net Compact Framework;" 2003; available at: https://link.springer.com/content/pdf/10.1007%2F978-1-4302-0785-6.pdf.

Kariya, Abhirav et al.; "Access Modifiers in C++;" GeeksforGeeks; Jul. 22, 2017; available at: https://web.archive.org/web/20170722131700/https://www.geeksforgeeks.org/access-modifiers-in-c/.

Brantner, Matthias et al.; "Building a Database on S3;" Jan. 2008; available at: https://people.csail.mit.edu/kraska/pub/sigmod08-s3.pdf.

892 dated Oct. 19, 2020 which was issued in connection with U.S. Appl. No. 15/972,467.

892 dated Jun. 9, 2021 which was issued in connection with U.S. Appl. No. 15/972,467.

* cited by examiner

Client/Application Server

```
customerList = DocStore.select("Customer")
    .where("address"."country", "Germany")
    .lazy();
numDeliveryItems = 0;
for(c in customerList) {
    dp = isDeliveryPossible(c."name", c."address"."city")
    if(dp) {
        DocStore.update(c, "delivery", time.today()) - update field "delivery"
        numDeliveryItems += getNumItems(c."name")
        if(numDeliveryItems > 100) {
            break;
        }
    }
}
```

SELECT & FROM "Customer"
WHERE "address"."country" =
'Germany'

| customerList |
|---|
| addr |
| 0\|34 |
| 0\|450 |
| 1\|12 |
| 1\|87 |
| 1\|99 |

FIG. 11

| customerList | | |
|---|---|---|
| addr | name | city |
| 0\|34 | Smith | LA |
| 0\|450 | | |
| 1\|12 | | |
| 1\|87 | | |
| 1\|99 | | | direct memory access

```
Client/Application Server customerList = DocStore.select("Customer")
    .where("address"."country", "Germany")
    .lazy();
numDeliveryItems = 0;
for(c in customerList) {
    dp = isDeliveryPossible(c."name", c."address"."city")
    if(dp) {
        DocStore.update(c, "delivery", time.today()) – update field "delivery"
        numDeliveryItems += getNumItems(c."name")
        if(numDeliveryItems > 100) {
            break;
        }
    }
}
```

Client/Application Server

```
customerList = DocStore.select("Customer")
    .where("address"."country", "Germany")
    .lazy();
numDeliveryItems = 0;
for(c in customerList) {
    dp = isDeliveryPossible(c."name", c."address"."city")
    if(dp) {
        DocStore.update(c, "delivery", time.today()) - update field "delivery"
        numDeliveryItems += getNumItems(c."name")
        if(numDeliveryItems > 100) {
            break;
        }
    }
}
```

UPDATE "Customer" SET "delivery" = '11/21/17' WHERE & * = '0|34' customerList

| addr | name  | city | delivery |
|------|-------|------|----------|
| 0|34 | Smith | LA   | 11/21/17 |
| 0|450|       |      |          |
| 1|12 |       |      |          |
| 1|87 |       |      |          |
| 1|99 |       |      |          |

SYSTEM AND METHODS FOR PROVIDING A MEMORY SLICE DATA STRUCTURE FOR USE WITH DIVERSE MEMORY AND STORAGE MEDIA

CROSS-REFERENCE TO RELATED APPLICATION(S)

The present application is a continuation of U.S. patent application Ser. No. 15/972,467, filed on May 7, 2018, in the United States Patent and Trademark Office, the entire disclosure of which is hereby incorporated by reference for all purposes.

FIELD OF THE INVENTION

The disclosed embodiments are directed to providing a memory slice data structure for use across diverse types of memory and storage media.

BACKGROUND

A document database, also referred to as a document store, differs significantly from a traditional relational database (RDB). Relational databases generally store data in separate tables that are defined by a database administrator, in which data of a single data object may be spread across several tables. Meanwhile, document databases can store all information for a given object in a single database instance, and each stored object can differ from other stored objects. In other words, there may be no internal structure that maps directly onto the concept of a table, and the fields and relationships generally don't exist as predefined concepts. Instead, all of the data for an object is placed in a single document, and stored in the document database as a single entry. This makes mapping objects into the database a simple task, normally eliminating anything similar to an object-relational mapping. Accordingly, a document store is attractive for programming web applications, which are subject to continual change in place, and where speed of deployment is an important issue.

SUMMARY

In disclosed embodiments, a binary data format (i.e., data structure) for documents is disclosed that serves multiple purposes. The Document Store Engine stores data in the form of memory "slices". Data manipulation language (DML) operations change these slices, whereas query language (QL) operations retrieve data from them. Slice data which is stored in memory can be stored as a "snapshot" or "checkpoint" to disk. In disclosed embodiments, the data structure of the slice is self-contained, so it can be written as a continuous block of data. When loading from a disk, each slice can be loaded back into memory as a whole and does not contain pointers or addresses specific to the host system. In disclosed embodiments, log entries (which are a small amount of data volume relative to the slices) may be applied afterwards to the slice data in memory to account for transactions which occurred after the checkpoint or snapshot of the slice was stored to disk.

In disclosed embodiments, the binary data structure is self-contained (i.e., it is a consecutive piece of memory and does not contain absolute pointers to memory addresses). Therefore, the binary data structure is well suited for remote direct memory access (RDMA), which can be used to allow other processes of the same database to access the slice remotely.

In one aspect, the disclosed embodiments provide a data storage and retrieval system for a computer memory, and a corresponding method and computer-readable medium storing instructions to execute the method. The system includes a processor programmed to configure the computer memory according to: a memory slice formed of one or more formed of segments and adapted to contain one or more documents; a checkpoint adapted to persist the memory slice; and a log file containing operations which have been performed on the memory slice but have not yet been persisted in the checkpoint. The checkpoint includes a document vector containing at least a first document pointer corresponding to at least a first document. The first document pointer includes a segment identifier identifying a logical segment of the memory slice and an offset value defining a relative memory location of the first document within the identified segment. The checkpoint further includes one or more checkpoint memory blocks. Each of the checkpoint memory blocks is configured to store a copy of a corresponding segment of the memory slice with operations contained in the log file being removed so that the checkpoint memory blocks, in conjunction with the log file, are adapted to recreate the memory slice. The segment identifier of the first document pointer identifies a first checkpoint memory block and the offset value of the first document pointer defines a relative location of the first document within the first checkpoint memory block.

Embodiments may include one or more of the following features.

The checkpoint may be adapted to persist the memory slice to disk or non-volatile memory. In the latter case, the system may be configured to apply at least one of a DML operation and a replayed log entry to the memory slice persisted in the non-volatile memory without loading the slice into the computer memory. The computer memory may be adapted to be accessed by a remote host using addressing which includes an address of a slice persisted in a checkpoint memory block and an offset value defining a relative location within the slice.

The system may include a query processor configured to find documents in the computer memory which meet search criteria, apply a lock to a slice containing the documents, return an address of a start of the locked slice, and return offset values defining relative locations of the documents within the locked slice. The system may include a query processor configured to return an address of a slice and an offset value defining a relative location within the slice of a document to allow a remote host to pull a specific document from the checkpoint. A segment identifier identifying a slice and an offset value defining a relative location within the identified slice may be mapped to objects to allow object-oriented code to directly access data stored in the slice.

BRIEF DESCRIPTION OF THE DRAWINGS

FIGS. 11-13 depict pseudo-code describing a process performed by an application server for object relational mapping and a resulting data table.

DETAILED DESCRIPTION

Figure 1:
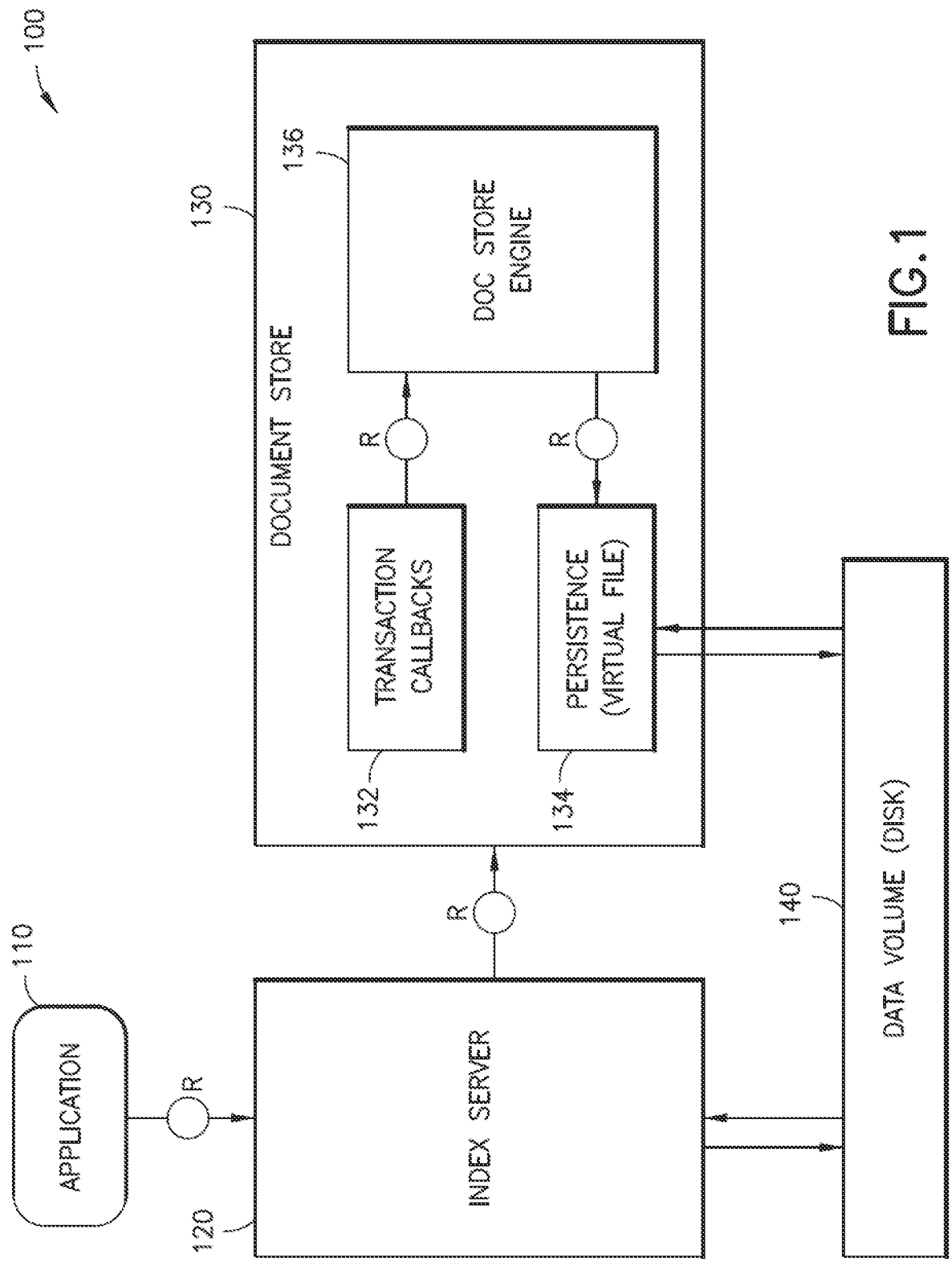
FIG. 1 is a diagram of a database computing architecture including a document store.

FIG. 1 is a block diagram of a database computing architecture including a document store (referred to as "DocStore"), which is a store for JavaScript Object Notation (JSON) artifacts and which allows native operations on JSON, including filtering, aggregation, and joining JSON documents with column or row store tables. JSON documents are stored in so-called "collections." The content of a JSON document may be deeply structured but unlike, for example, extensible markup language (XML), JSON does not have a schema. This means that any valid JSON data may be inserted without first declaring its structure.

The architecture 100 includes an application 110 that interacts with an index server 120 for processing client/application requests. The index server 120 manages a document store 130 which may be an in-memory data structure such as dynamic random access memory (DRAM) or the like storing client data. The index server 120 and the document store 130 may both store data to disk 140. For example, the document store 130 may store checkpoints to disk 140, in response to the system requesting a checkpoint operation.

The database computing architecture 100 may be incorporated within a database system such as an in-memory, column-oriented, relational database management system that functions as a database server to store and retrieve data as requested by software applications. The database system may combine both online analytical processing (OLAP) and online transaction processing (OLTP) operations into a single system. The database system may store data in main memory (e.g., document store 130) rather than on disk 140 which provides for faster data access, and by extension, faster querying and processing. The document store 130 may be provided in addition to other types of storage architectures, such as, for example, a column store and a row store (not shown). In disclosed embodiments, the document store 130 is an independent store which interacts with either of the column store and the row store for data storage.

In disclosed embodiments, the index server 120 may perform session management, authorization, transaction management and command processing. Although shown as separate components in the example of FIG. 1, in some cases, the index server 120 may include the document store 130 as the engines for processing the data. The client application 110 may submit structured query language (SQL) and multidimensional expression (MDX) statements to the index server 120 in the context of authenticated sessions and transactions which may be executed on data included in the document store 130 as well as other data stores. The index server 100 also manages persistence between cached memory images of database objects, log files and permanent storage files.

An application 110 provided by a user may perform operations on the database. Connection and session management processes may be performed by the index server 120 to create and manage database clients and the corresponding applications such as the user's application 110. Once a session is established, the application 110 can communicate with the database using SQL statements, for example. For each session, a set of parameters may be maintained such as auto-commit, current transaction isolation level, etc. Also, users may be authenticated either by the database itself (e.g., login with username and password) or authentication may be delegated to an external authentication provider, such as an LDAP directory.

In disclosed embodiments, client requests (e.g., requests originating from the application 110) are analyzed and executed by the index server 120. For example, incoming SQL requests may be routed to an SQL processor of the index server. Data manipulation statements may be executed by the SQL processor. As another example, other types of requests may be delegated to other components. For example, data definition statements may be dispatched to a metadata manager, transaction control statements may be forwarded to a transaction manager, planning commands may be routed to a planning engine and procedure calls may be forwarded to a stored procedure processor. An SQL statement may be processed in the context of a transaction. New sessions may be implicitly assigned to a new transaction. The transaction manager may coordinate database transactions, controls transactional isolation and keeps track of running and closed transactions. When a transaction is committed or rolled back, the transaction manager informs the involved engines (e.g., document store 130, column store, row store, etc.) about this event so they can execute necessary actions. The transaction manager also cooperates with a persistence layer of the index server to store data to disk 140 to achieve atomic and durable transactions.

In disclosed embodiments, the index server 120 may provide a metadata manager component. The metadata may include a variety of objects, such as, for example, definitions of relational tables, columns, views, indexes and procedures. Metadata of all these types may be stored in one common database catalog for all stores. The database catalog may be stored as tables in a row store. The features of the database, such as transaction support and multi-version concurrency control, are also used for metadata management.

The index server 120 may support a number of data stores of different types (i.e., having different engines) such as a document store 130, a column store, and a row store, and the like. As described herein, a store is a sub-system of the database which includes in-memory storage, as well as the components which manage the storage. For example, a row store may be a database row-based in-memory relational data engine. Meanwhile, a column store may store tables column-wise. The document store 130 (also referred to as a JSON document store) may store documents in the form of collections. The need to store unstructured data such as social media, multimedia, etc. has grown rapidly. SQL meanwhile requires structure to be specified in advance which means that any changes to the information schema require time-consuming alter statements to run on a table. The document store 130 overcomes this issue by loosening the restrictions on database schema and allows data to be grouped together more logically and naturally. In the document model, each record and its associated data is through of as a "document."

In the document store 130, all data related to a database object is encapsulated together. As a result, documents are independent units which make performance better and make it easier to distribute data across multiple servers while preserving locality. Furthermore, application logic is easier to write because no translation is needed between objects in an application and relational tables. Rather, the object model can be turned directly into a document. Also, unstructured data can be stored easily since a document may contain whatever keys and values the application logic requires. The callback transaction layer 132 may receive requests from the index server 120 and process those requests on content stored in the document store engine 136.

The document store 130 may also include a persistence layer 134 which provides data persistency to disk 140. Like a traditional database, page management and logging may be performed by the persistence layer 134. According to various embodiments, the changes made to the in-memory database pages may be persisted through checkpoints. Checkpoints may be written to data volumes on the persistent storage 140 for which the storage medium is hard drives. All transactions committed in the database are stored/saved/referenced by a logger 134 of the persistence layer 134 in a log entry written to the disk 140 on the persistent storage. To get high I/O performance and low latency, log volumes may use flash technology storage. Furthermore, the persistence layer 134 is responsible for durability and atomicity of transactions. This layer ensures that the database is restored to the most recent committed state after a restart or other loss and that transactions are either completely executed or completely undone. To achieve this in an efficient way, the persistence layer 134 uses a combination of checkpoints and logs.

Figure 2:
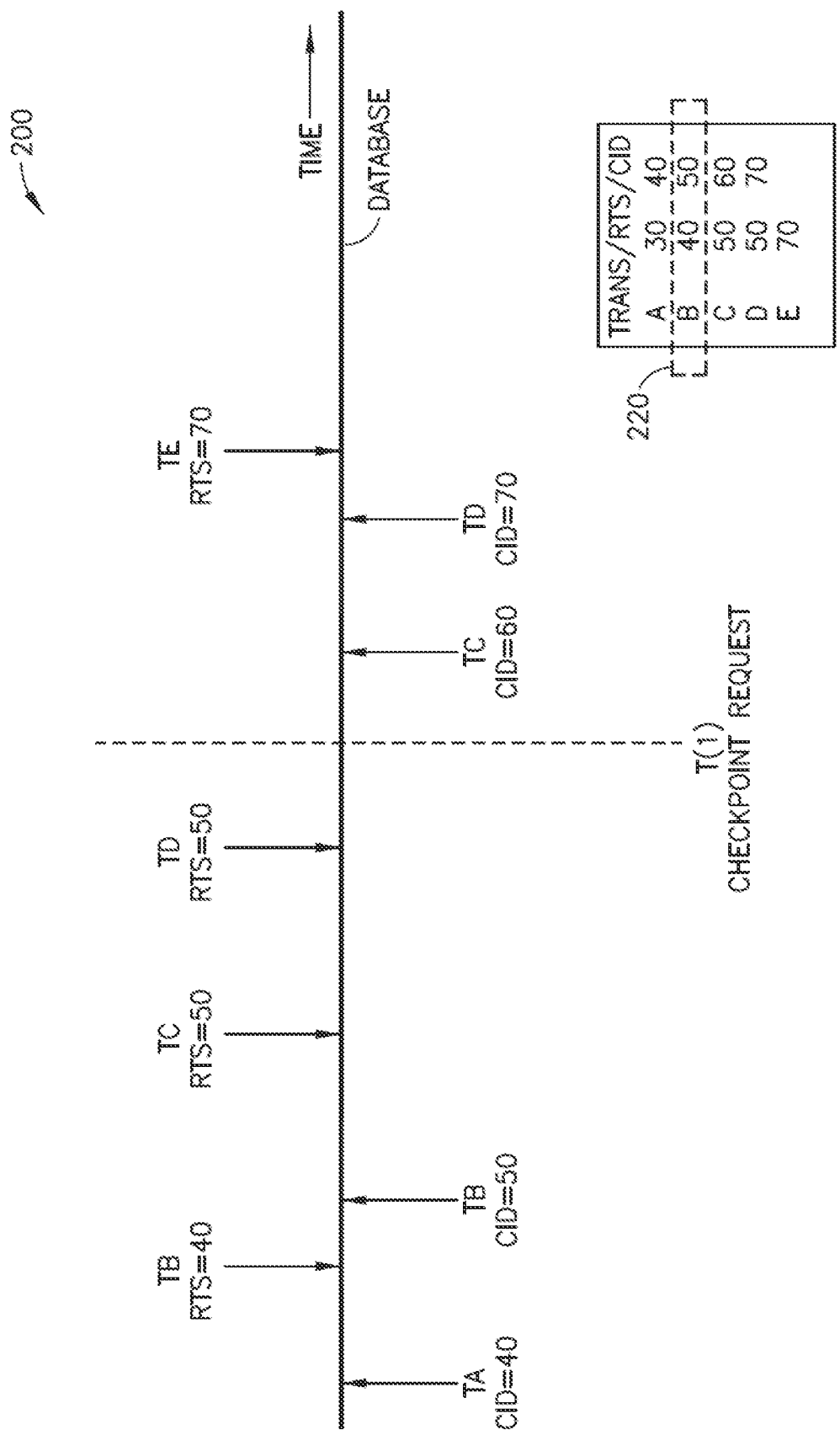
FIG. 2 is a diagram illustrating a process of database transactions performed over time.

FIG. 2 illustrates a process 200 of database transactions performed over time, in accordance with an example embodiment. The process of FIG. 2 may be used to establish a checkpoint identifier which is also referred to herein as a timing identifier. Referring to FIG. 2, database transactions occur over time. Simply as a matter of convenience, each transaction in this example includes a read operation and a write operation with reads being performed on top of the timeline and commits being performed on the bottom of the timeline. Each time an initial read operation occurs for a transaction, the transaction is assigned a timestamp which may be referred to as a read timestamp. Here, the timestamp may not be a clock time received from a system clock, but may instead be an incremental counter value received from a transaction manager or other program executing on the database. In addition to the read timestamp, when a transaction is subsequently committed to the database, the transaction is assigned a commit identifier. The database may be structured such that a read operation of a next transaction may be assigned a read timestamp equal to a commit ID of a previous transaction that was most recently committed to the database.

Referring to the example of FIG. 2, the first transaction on the timeline is transaction A which is committed to the database and assigned a commit ID of 40. The next transaction to occur is transaction B which reads from the database and is assigned a read timestamp of 40 which corresponds to the commit ID of the most recently committed transaction (transaction A). This means that transaction B may read data written by transaction A, and all transactions that have been committed before transaction A. The next interaction with the database is the commit of transaction B to the database which is assigned a commit ID of 50. In this example, the commit ID may be generated by an incremental counter managed by a transaction manger, a component within the document store, and/or the like. The increments may be anything (numbers, letters, etc.) which can chronologically indicate an order of timing of operations.

According to various embodiments, when a transaction performs a read operation from the database, the only other transactions that are visible to the read operation are those transactions that have already been committed prior to the read occurring. The read snapshot that defines until which commit may be read is either stable for a transaction (transaction isolation), or stable within the boundaries of a statement (statement isolation). This is a setting per transaction or session that has to be defined prior to any data access. In the example of FIG. 2, transaction isolation shall be used and transaction C performs a read operation and is assigned a read timestamp of 50 corresponding to the most recent commit ID of transaction B. Meanwhile, transaction D represented by reference numeral 222 in the table performs a next read operation by reading from the database and is also assigned the same read timestamp of 50 because that is still the most recent commit ID. Here, the result of transaction C is not visible to transaction D because transaction C has not committed to the database yet but instead has only performed a read. Accordingly, transaction D is not able to see transaction C. Because transaction C is not visible to transaction D, the most recent transaction that is visible to all transactions in the database is transaction B which has a commit ID of 50.

In this example, the database may receive a request to perform a checkpoint for contents of the database at a time (T1) represented by the vertical dashed line shown in FIG. 2. The example of FIG. 2 assumes that only the transactions shown in FIG. 2 are all transactions in the database. In this example, the database may select a commit ID of a most recent transaction that is visible to all subsequent transactions as a checkpoint identifier (also referred to herein as a minimum read timestamp or a timing identifier). The selected timing identifier is therefore visible to every transaction in the system that comes after it. Every value that is below the timing identifier is visible to every transaction currently pending and that will come in the future. In this example, the most recent transaction committed and visible to all subsequent transactions is transaction B having a commit ID of 50 and represented by reference numeral 220 when the checkpoint is performed at the time T1. Therefore, the database may select a timing identifier of 50 which may be used to perform the checkpoint process and trim the log file as described herein.

A transaction manager may maintain an identification of a current commit ID and a current read timestamp. Previous transactions only become visible to a current transaction being read if the previous transaction was committed before the new transaction started (assuming transaction isolation). Accordingly, if a transaction starts, writes of other transactions are not visible if these have not yet been committed. The read timestamp assigned to each transaction during the read operation means that every object is only visible to this transaction if it is assigned a commit ID that is less than or equal to a number associated with the current transaction. Accordingly, the system is aware of what is visible to a transaction based on the commit ID. The commit IDs and the read timestamps are what is used to figure out what has been written by which transaction to provide an understanding of what is visible to a new transaction. Everything with a commit ID that is equal to or less than a current read timestamp is visible to a currently read transaction, in the example of FIG. 2.

Figure 3A:
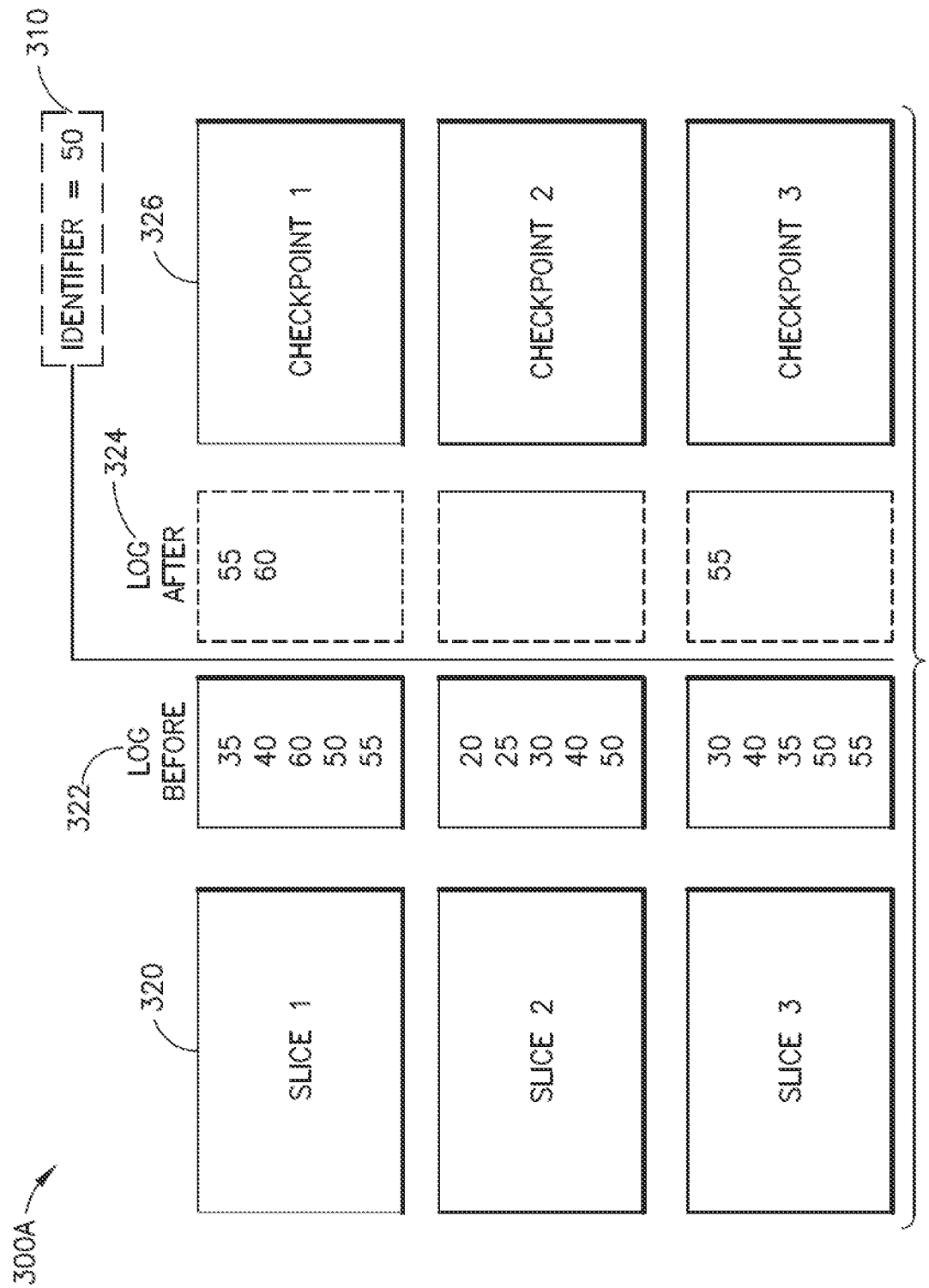
FIGS. 3A-3B are diagrams which depict generating and storing checkpoints based on slices in memory and a log file.
Figure 3B:
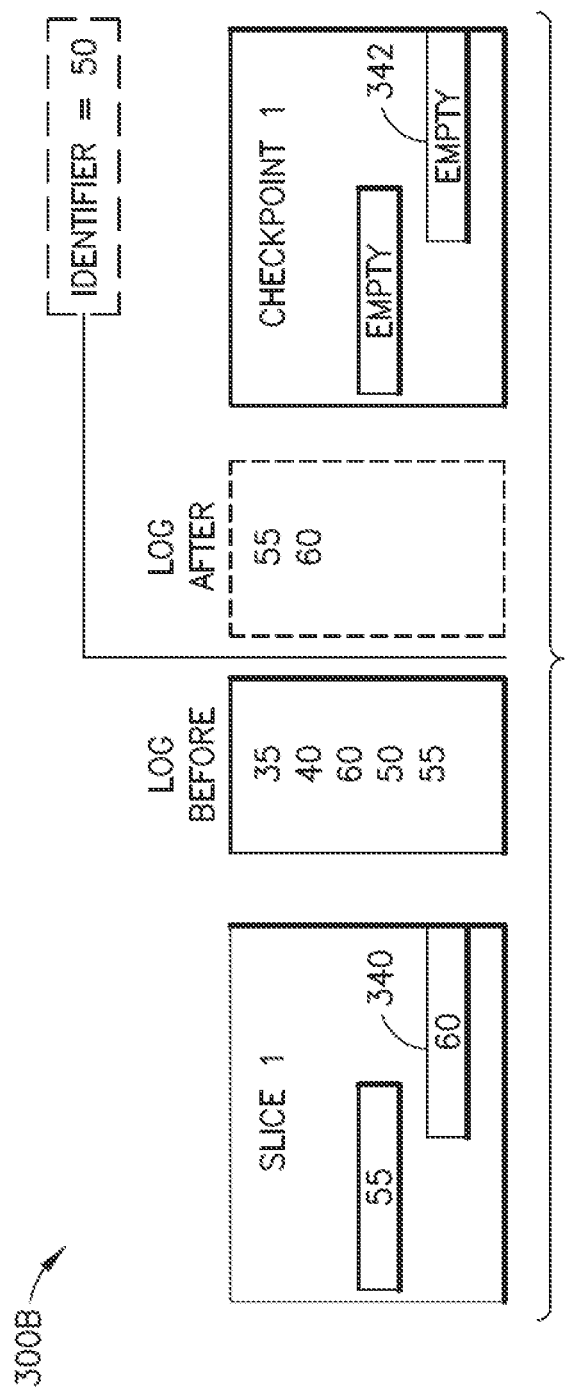

FIGS. 3A-3B depict generating and storing checkpoints based on slices in memory and a trimmed log file. In this example, FIG. 3A depicts a configuration in which checkpoint operations are performed on a plurality of memory slices, and FIG. 3B depicts specific aspects of data being stored based in a checkpoint operation of one of the slices depicted in FIG. 3A.

A checkpoint operation may be performed on a slice-by-slice basis. In such as case, whatever is currently residing in a slice of memory is copied to disk as a checkpoint and the log file is cleaned up or otherwise trimmed. When the system needs to reload a slice, a checkpoint copy on disk may be loaded into the in-memory document store 130 (see FIG. 1), which reconstructs most of the slice in one operation and makes the reload process significantly more efficient than scanning through a log file and re-applying the entire history of previous operations (e.g., insert, update, delete, etc.) to the data. Following the loading of a checkpoint, previous operations remaining in the trimmed log are replayed/re-applied, but given that the log has been trimmed, the volume of replayed operations is lower and therefore the overall load time shorter than without the use of checkpoints.

Referring to FIG. 3A, a checkpoint operation is performed on three slices of memory. In this example, a slice of memory 320 has a log before 322 representing a record of all transactions occurring on the slice of memory 320. This log is represented using timestamps of the most recent transactions. Here, the system issues a checkpoint request and a timing identifier of 50 which is the minimum read timestamp in the system at the point in time of the checkpoint. Accordingly, all transactions with a read timestamp less than or equal to the timing identifier may be removed from the log because those transactions are visible to every transaction currently pending. In this case, the log before 322 the checkpoint is trimmed to the log after 324 based on the timing identifier 310. In addition, a copy of the data included in the slice 320 may be stored on disk as a checkpoint 326. Here, the data may be copied from the slice and stored to disk with or without a compression process. Meanwhile, the log after 324 may also be stored with the checkpoint 326 (or as part of the checkpoint) and can be used to reconstruct only those transactions which are not visible to all transactions when the checkpoint request is received. Therefore, the accurate memory contents can be restored without having to execute the entire transaction log.

In some embodiments the minimum read timestamp is being used to define the snapshot of what is included in the checkpoint. In these embodiments the minimum read timestamp may define data that is "fixed" in the sense that all transactions may see it, all post-processing (like garbage collection) has been executed on it and all data may be accessed without locking etc. In alternative embodiments, checkpoints are being created using higher timestamps, for example equal to the highest commit ID in the system. Accessing the data may require further steps, like acquiring locks to prevent parallel processing of the data, checks whether the data has been deleted (and is therefore subject to garbage collection) or the like.

As shown in the example of FIG. 3B, a slice may include data from transactions in the trimmed log file, i.e., "log after" file, corresponding to timestamps 55 and 60. Should a restart occur, these transactions are re-executed from the "log after" file. Therefore, this data is removed from the slice representation prior to storing the checkpoint to disk. In other words, results of database operations generated by the transactions at timestamps 55 and 60 are undone or otherwise removed from the slice and not persisted in Checkpoint 1, for example via a transaction rollback. This prevents the transactions from being performed redundantly when the log after is read and used to reconstruct the memory slice. Here, a memory block 340 in the slice of memory is shown as an empty block 342 (or a gap) in the checkpoint on disk. It may or may not be filled when replaying the "log after" file, based on whether the corresponding transactions were committed. Typically, this gap is at the end of the data and therefore the file is simply shorter.

Figure 4:
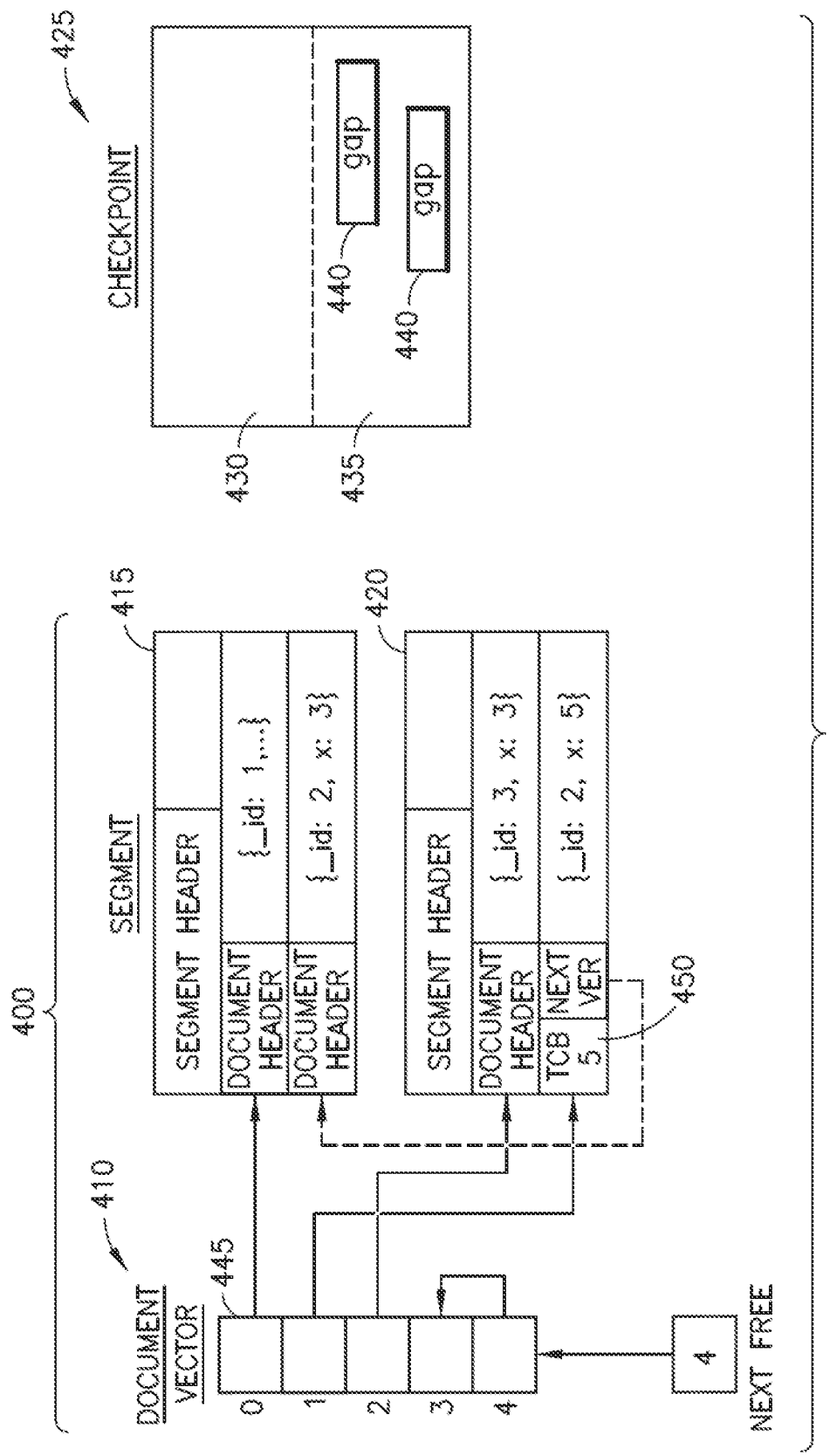
FIG. 4 depicts a memory slice using a document vector to point to memory locations, along with a checkpoint with corresponding memory blocks for each segment.

FIG. 4 depicts a memory slice 400 using a document vector 410 to point to memory locations, e.g., segments (415 and 420), along with a checkpoint 425 with corresponding memory blocks (430 and 435) for each segment (415 and 420). The checkpoint 425, as discussed above, may have gaps 440 corresponding to transactions which are still in the log file. The slice 400 contains a number of documents 445, i.e., pointers to documents, in a configuration referred to as a document vector 410. The documents 445 are inserted into the document vector 410 in an INSERT operation, what stores the data of the document in the segments (415 and 420) and stores a pointer to the memory addresses of this stored data into the document vector 410. Each document 445 in the vector 410 is actually a pointer to a memory location, as opposed to the data of the document itself.

For example, document 0 points to a document header in a first segment 415 of memory which contains document 0. Document 1 points to a document header of the second segment 420, which contains a newer version of document 1 which has been updated. Therefore, the document vector 410 has been updated to contain a pointer to the updated version of the document stored in the second segment 420, whereas it previously pointed to the first segment 415.

When a search is performed on documents in a memory slice, the operation goes through the document vector 410, which points to where the data is stored, i.e., memory addresses in the segments (415 and 420), and allows direct access to the data. A transaction control block 450 in the document header, e.g., the header of the newer version of document 1, provides a transaction view so transactions attempting to access the document can be informed whether they are permitted to see the version in question, i.e., whether the version is visible to the request, i.e., the transaction. For example, in a SELECT operation (i.e., search), documents are found which match search criteria and it is determined which documents are visible to the transaction. Therefore, the search operation goes through the document vector 410 and finds the document header for each document stored in the segments (415 and 420). If the document which is located is visible to the transaction, then it is used for further processing. If not, then a path is followed to a previous version until a version is found which is visible to the requestor.

Figure 5:
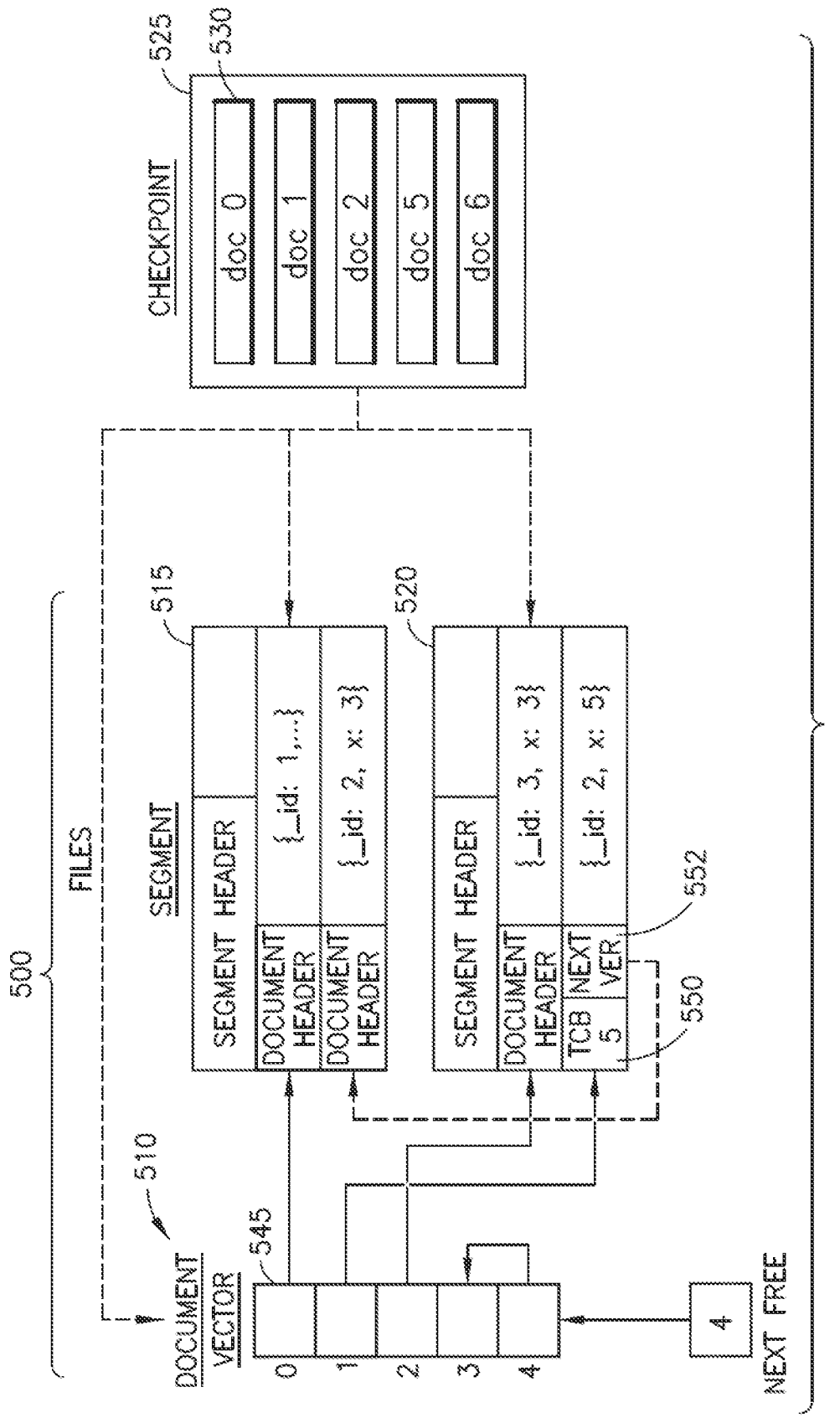
FIG. 5 depicts a memory slice, including a document vector and memory segments in an operation to reload data from the checkpoint.

FIG. 5 depicts a memory slice, including a document vector 510 and memory segments (515 and 520) in an operation to reload data from the checkpoint 525. In disclosed embodiments, the data structure of the checkpoint 525 may not be an actual memory block. Rather, the checkpoint 525 may be a list of individual documents 530. In such a case, the checkpoint 525 is accessed and each listed document 530 is restored to the document vector 510 one at a time in an operation that resembles the INSERT operation, i.e., insert logic is the primary mechanism for performing the reloading. The document vector 510 is filled in this operation and pointers 545 are set so that they point to the respective document headers in the segments (515 and 520) in memory. Thus, the actual data of the documents 530 is in the segments (515 and 520) of memory so processing can be performed on the data. Each document stored in the segments (515 and 520) has a header and may refer to transaction control block (TCB) 550, which may change as transactions are performed. For example, if there is a COMMIT operation (i.e., an operation marking a transaction as atomically committed in the persistent storage), such an operation marks a document as committed, which means that the document vector 510 points to the document header, but its associated transactional information changes. In the case of an UPDATE operation, there is a chain of operations which uses the real memory address 552 stored in the document header 550 (the header including the link to TCB 5 and the "Next Ver" link) to jump to memory locations for the version of the document which is needed.

Figure 6:
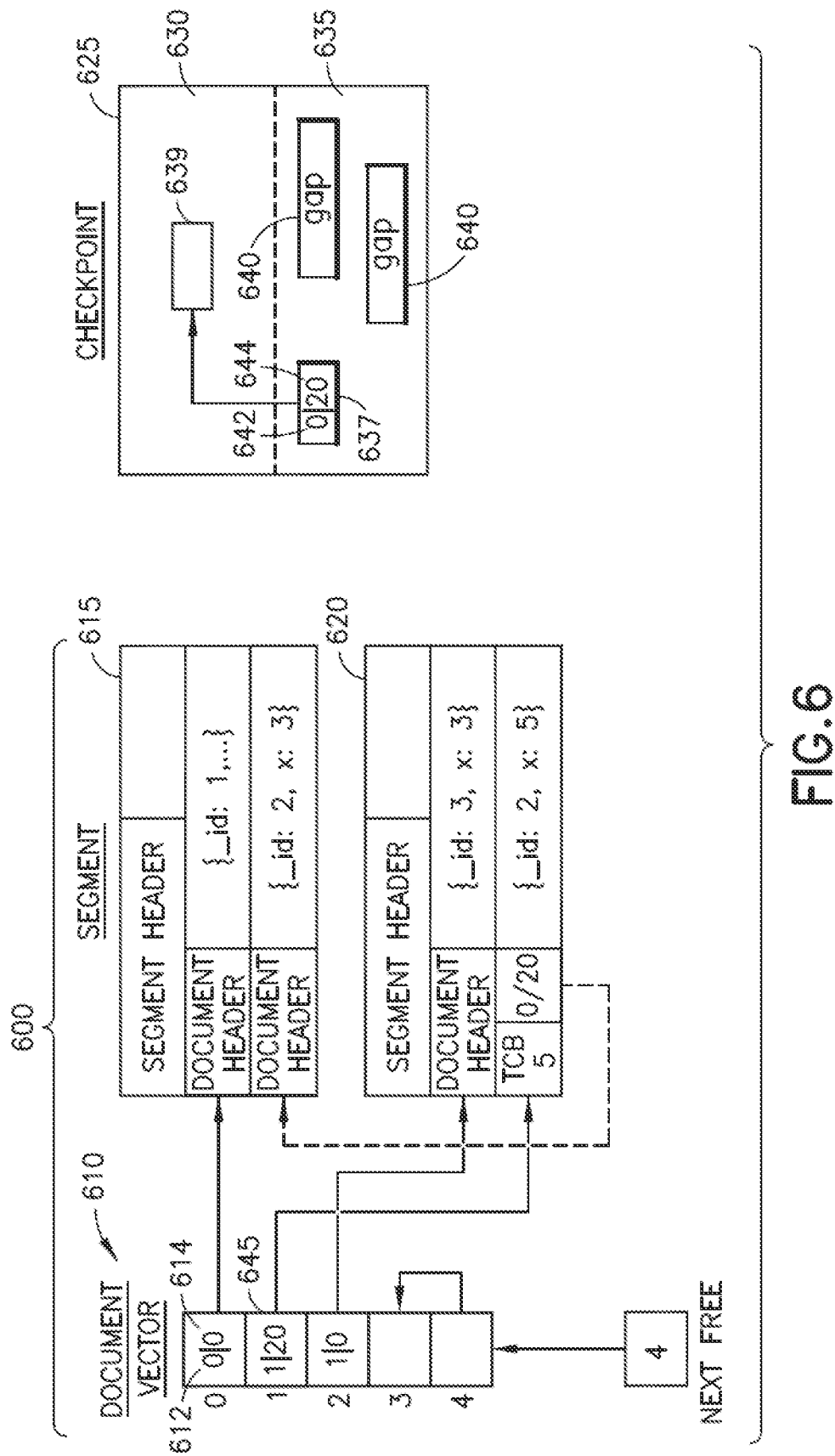
FIG. 6 depicts a memory slice in which the document vector has pointers which include a segment number and an offset value.

FIG. 6 depicts a memory slice 600 in which the document vector 610 has pointers which include a segment number 612 and an offset value 614. In the example depicted, each pointer has a segment number 612, e.g., 0 or 1, to identify a segment (615 and 620) in which the document is stored. Each document 645 in the document vector (i.e., pointer to a document) also has an offset value 614 which provides the relative location of the beginning of the document within the segment (615 and 620), e.g., an offset in kB. This configuration provides an alternative internal data structure for pointing to other versions, i.e., it uses logical segment numbers 612 plus a relative physical offset 614 within the segment (615 and 620), rather than a memory address. Thus, the data is self-contained.

The checkpoint 625 used with this configuration contains data stored in memory blocks (630 and 635) corresponding to the segments (615 and 620), which is used in conjunction with a log (see, e.g., FIGS. 3A and 3B), to recreate a memory slice 600. In this embodiment, the checkpoint 625 has a pointer 637 (with a segment identifier 642 and an offset 644) to another document 639, which in this example happens to be in another segment 630, but could be anywhere. This has the effect of removing things from the checkpoint 625 which are specific to the target system, e.g., memory addresses. The checkpoint 625 becomes self-contained, in the sense that it uses a real offset value which is valid within the data of the checkpoint but is not valid in a more global environment. Such a configuration allows the checkpoint 625 to be stored differently than discussed with respect to other embodiments because it allows segments (615 and 620) to be stored one-by-one in the corresponding memory blocks (625 and 635) of the checkpoint storage. Therefore, when writing a checkpoint 625, the start of a slice, or slice segment (615 and 620), can be specified and then the entire slice can be copied as one large block of memory without concern that pointers will become invalidated. In the example depicted, this means that the checkpoint 625 will include two memory blocks (630 and 635) (which are separated by a dashed line in the figure) which were dumped, corresponding to the first segment 615 and the second segment 620. In such a case, if there is a pointer to another location within the same segment or in another segment, e.g., a pointer 637 to segment 0 with an offset of 20, this pointer remains valid when the checkpoint is dumped. By virtue of this configuration discussed above, in disclosed embodiments, the checkpoint can be opened and large memory copies can be performed (while keeping track of the gaps 640 due to transactions in the log), as opposed to copying a number of smaller, individual things, e.g., documents, and tracking the versions of the documents.

Figure 7:
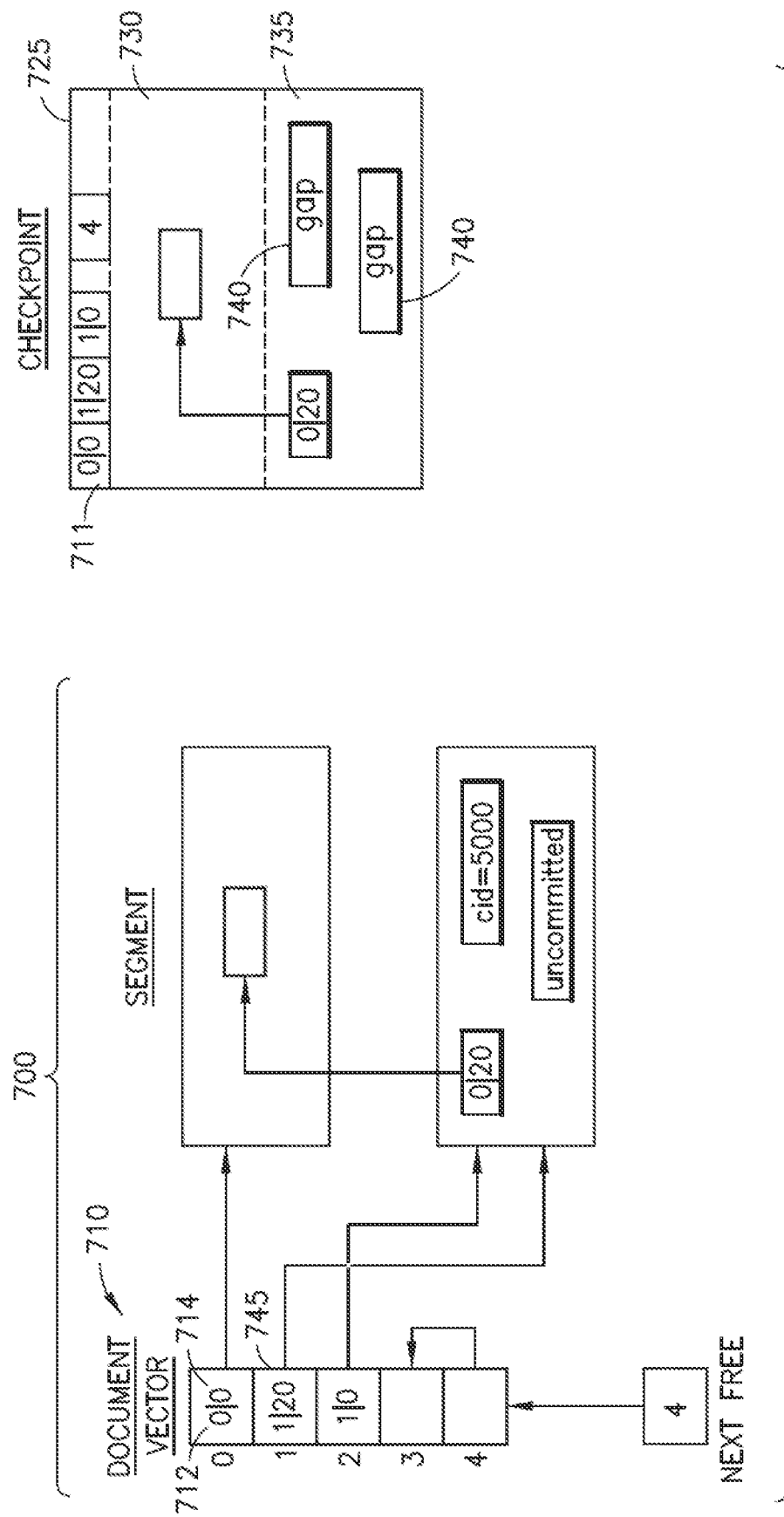
FIG. 7 depicts a memory slice in which the document vector has pointers which include a segment number and an offset value and the document vector is stored in the checkpoint.

FIG. 7 depicts a memory slice 700 in which the document vector 710 has pointers 745 which include a segment number 712 and an offset value 714 and the document vector 710 is stored in the checkpoint 725. In disclosed embodiments, checkpoint data is stored as memory blocks (730 and 735) without individual documents defined therein, and the document vector 710 is stored in a designated block 711 of the checkpoint 725. When the checkpoint 725 is opened, e.g., to restore the segments (715 and 720) of a memory slice after an unload or after a crash, the document vector 710 can be pulled from the designated block 711 and be restored in a single action in a manner akin to the segments, which are dumped out of the checkpoint as blocks (whereas in the embodiment of FIG. 5, the checkpoint is restored document-by-document by inserting the documents into the document vector, which inherently regenerates the document vector and fills the segments with data). As in other embodiments discussed herein, the checkpoint 725 must maintain gaps 740 to account for transactions, which will be performed when the log (see, e.g., FIGS. 3A and 3B) is executed such as, for example, cid=5000 {"myKey": 1} and uncommitted {"myKey": 1} (shown in abbreviated form in the segment depicted in FIG. 7).

The binary data format for documents discussed above serves multiple purposes. The data structure of the slice is self-contained, so it can be written as a continuous block of data. When loading from a disk, each slice can be loaded back into memory as a whole. Log entries (which are a small amount of data volume relative to the slices) can be applied afterwards to the slice data in memory to account for transactions which occurred after the slice was stored to disk.

In disclosed embodiments, the multi-purpose data structure may be stored in non-volatile memory (NVM). In such a case, when a slice is loaded and stored in NVM, it is not copied to random access memory (RAM). Rather, the slice data is used while it is residing in the NVM. In disclosed embodiments, the snapshot or checkpoint which is stored in NVM may be changed by new DML operations or by log entries which are replayed, i.e., applied to the slice data. Therefore, a small overlay layer is provided which points to the comparatively large NVM block while consuming only a small amount of RAM.

Figure 8:
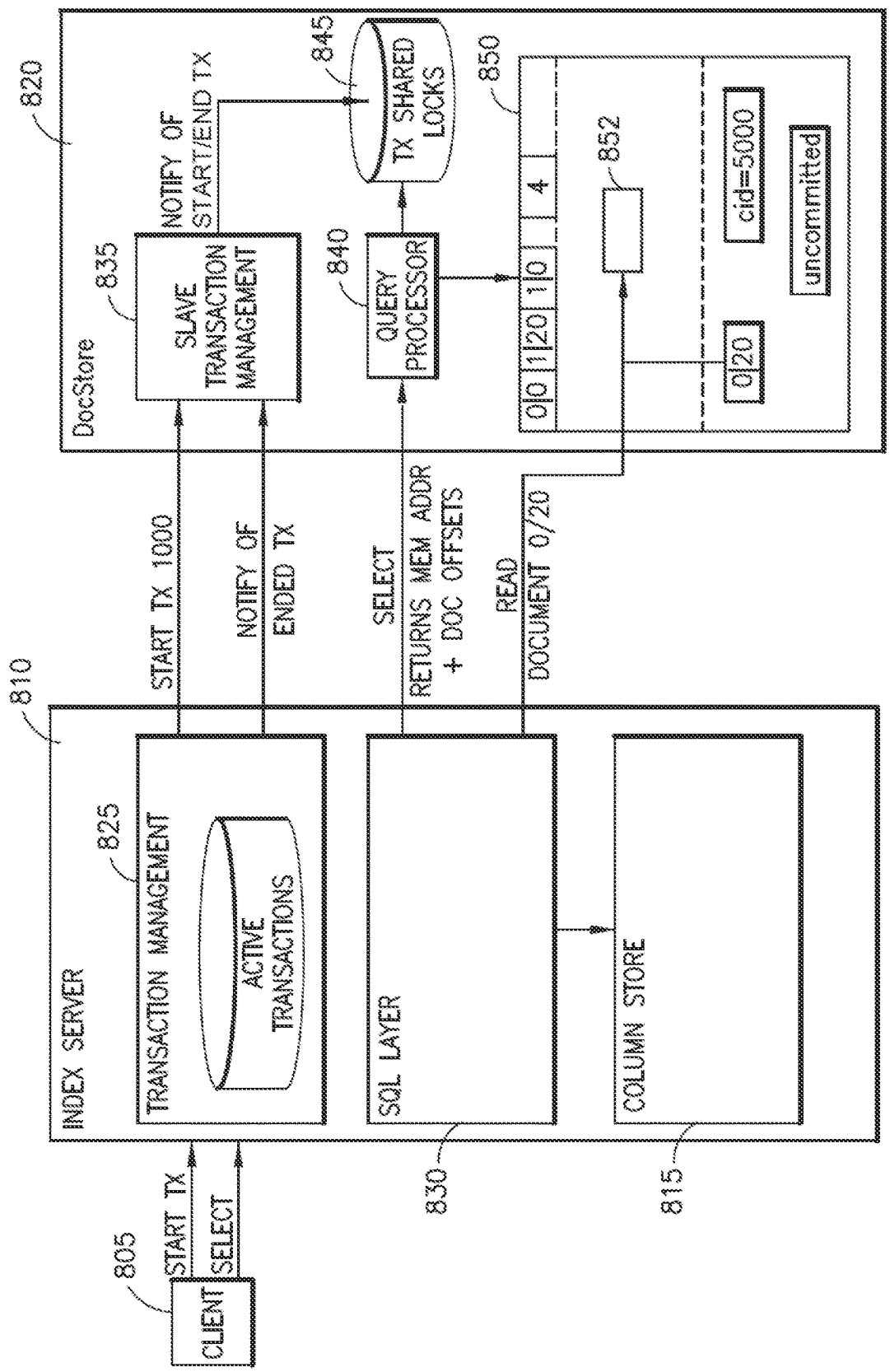
FIG. 8 is a diagram of a client communicating with an index server to perform operations on a column store and a document store.

FIG. 8 is a diagram of a client 805 communicating with an index server 810 to perform operations on a column store 815 and a document store ("DocStore") 820. The index server 810 has transaction management, i.e., master transaction management 825, so it is aware of what transactions exist in the system. The index server 810 also has an SQL layer 830 to perform search functions involving the column store 815 in the index server and the DocStore 820. The master transaction management 825 communicates with a transaction shell, i.e., slave transaction management 835, in the DocStore 820.

In disclosed embodiments, for a search operation, e.g., a SELECT operation, the SQL layer 830 may pull data from both the column store 815 and the DocStore 820. The SQL layer 830 may combine the data from these two sources and perform processing on the combined data set. In some cases, the amount of data pulled from the DocStore 820 may be large. After processing of the large data set in the index server 810, the data that was just pulled may be removed.

In an alternative embodiment, while performing processing of the data in the SQL layer 830, including data from the column store 815, the index server 810 may pull small chunks of data from the DocStore 820 on an as-needed basis. For example, as depicted in FIG. 8, the query processor 840 performing a SELECT operation may indicate a transaction ID of 1000 and may obtain a lock 845 on a slice so it can get successive blocks of data without the slice being unloaded in the interim. It is possible that new data is inserted, updated, or deleted in the meantime while the lock 845 is acquired. However, this situation would not differ from a typical data manipulation language (DML) operation, and parallel read operations, as these perform atomic changes to the slices that never conflict with memory areas which are not "visible" due to their transactional snapshot (i.e., "Consistent View"). Instead of returning actual data, the query processor 840 may return the address of a small piece of memory and may perform filtering to identify documents which match the search criteria. The query processor 840 may then directly return the start of a slice along with an identification of the document from a memory block which was read from the checkpoint 850, e.g., the document 852 at location 0|20, where 0 is the segment number and 20 is a relative physical offset within the segment. For example, the SQL layer 830 may request data that matches the search criteria, thereby starting transaction 1000, which applies a shared lock to the entire slice. The transaction returns, not the actual data but rather, the memory address where the data begins plus an indication of which documents match the search criteria. The SQL layer 830 may then request the actual data.

This process and configuration may be referred to as "late materialization," because the SQL layer 830 received the memory location, i.e., memory address, of the data (with a lock on the memory block so that it does not get unloaded while the SQL layer is accessing it) while performing processing, and was able to directly access the location where the data (e.g., a document 852) is stored and directly process the data. Eventually the transaction (transaction 1000) ends and the slave transaction manager is notified and, in turn, removes the shared lock 845 for the transaction.

Figure 9:
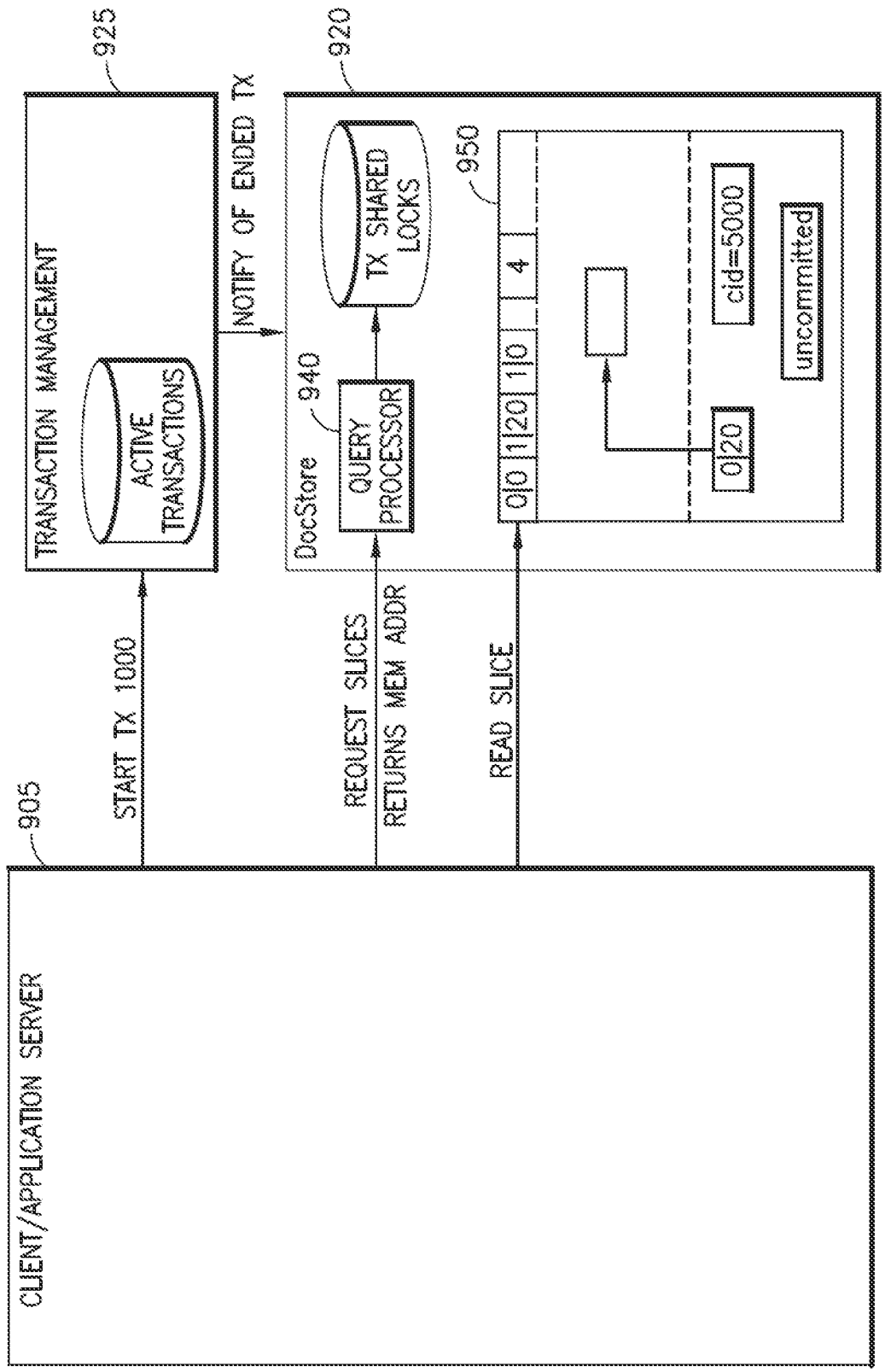
FIG. 9 is a diagram of an embodiment in which a client/application server is in direct communication with the document store.

FIG. 9 is a diagram of an embodiment in which a client/application server 905 is in direct communication with the DocStore 920. An application on the client/application server 905 may start a transaction, i.e., transaction 1000, by accessing the transaction management 925. The application may pull one or more entire slices from the DocStore 920 without any pre-processing or filtering by the query processor 940, as discussed above. Rather, the client library in the application itself performs the filtering and processing. The query processor 940 returns the memory address of the request slice(s) to the application. The application then has direct, remote access to the slice data stored in memory block 950. The application can then read the data from the memory block 950 and process it.

Figure 10:
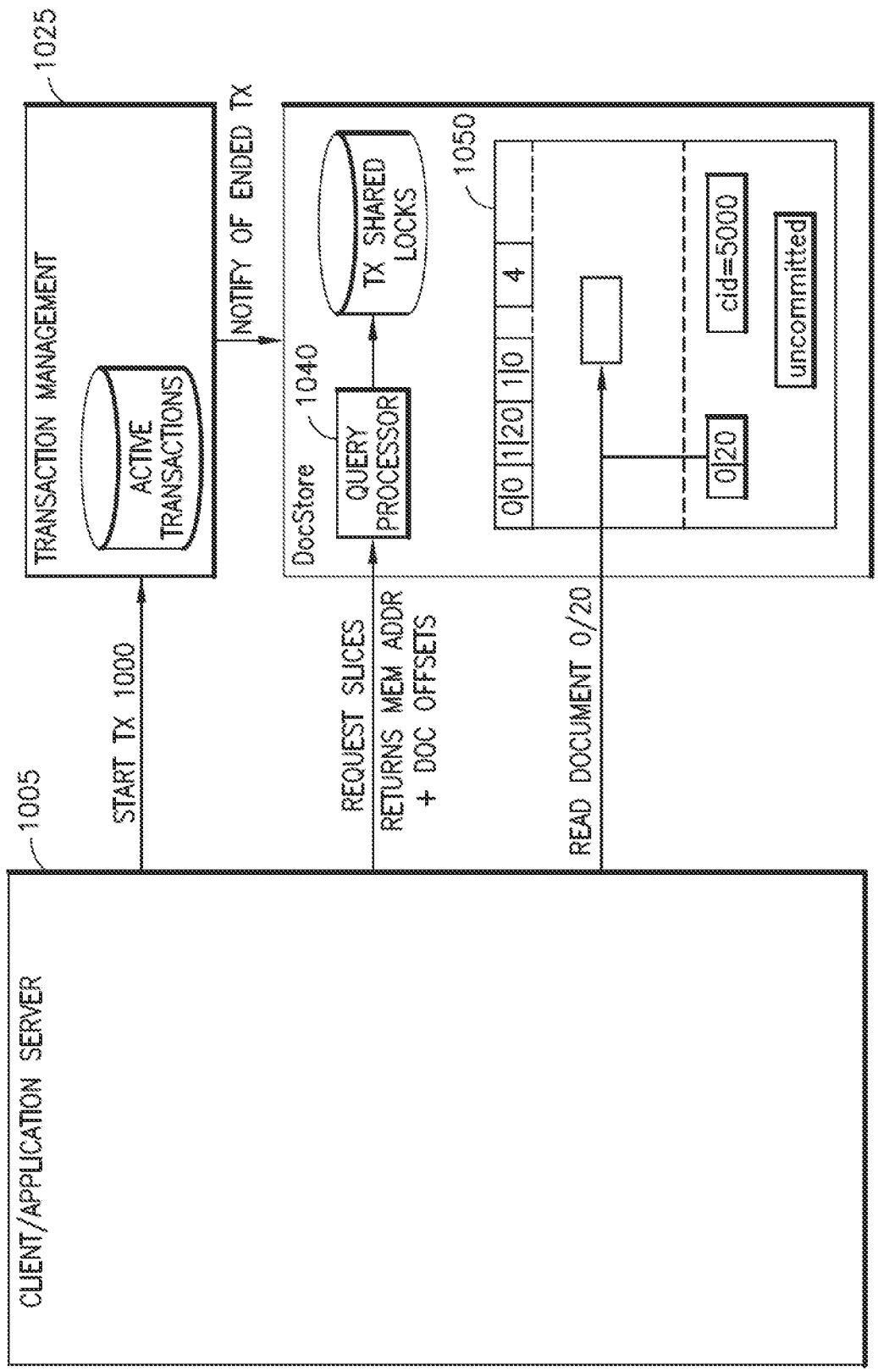
FIG. 10 is a diagram of an embodiment in which a client/application server is configured to retrieve individual documents from the document store.

FIG. 10 is a diagram of an embodiment in which a client/application server 1005 is configured to retrieve individual documents from the DocStore 1020. The application may start a transaction, i.e., transaction 1000, by accessing the transaction management 1025. The application requests slices from the query processor 1040, which returns memory addresses and relative offsets for the documents. The application can then read particular documents directly from the memory block 1050.

FIGS. 11-13 depict pseudo-code describing a process performed by an application server for "lazily" accessing database objects on an as-needed basis. The application code operates on local data structures that facilitate access to the remote document data. From a "developer experience" perspective, this is similar to object relational mapping (ORM) tools, but it internally works on documents, which are not relational. The application uses a Select method to query for a list of customers located in Germany. A parameter, lazy( ), is included in the method call to activate a set of features to ensure that data is being fetched only when needed. The pseudo-code uses a variable, the number of delivery items (numDeliveryItems), which is initially zero and is added to as a loop is performed over the customer list. The code calls a method, isDeliveryPossible, the output of which is a Boolean true or false. If delivery is possible, the delivery is updated and the delivery date is set for today. Another method is called, numDeliveryItems, to determine the number of items to be delivered based on the customer's name. Once the number of items to be delivered reaches 100, the process ends. Such a process may result in a large number of documents being returned—a large piece of memory— but only a few documents may be needed to reach the limit of 100 delivered items. Therefore, much more data may be pulled than is necessary.

In an alternative embodiment, instead of pulling the actual data, the process may receive an address where the data begins. In a typical scenario, such a query would receive numerous relative addresses because the data may be in many slices. In the depicted example, for the sake of clarity, only one relative address is shown. As shown in FIG. 11, a table created for the customer list has the relative data addresses but the actual data has not yet been pulled to fill in the table. As shown in FIG. 12, the name and city fields of the table can be pulled by performing direct memory access based on the relative addresses and extracting the desired data. As shown in FIG. 13, an update is done in the example depicted because delivery is possible, so today's date is added to a "delivery" field and this is used to update the data stored in the DocStore. This access to the DocStore data is "lazy" in the sense that only needed data is pulled, rather than a large block of data at one time.

Figure 14:
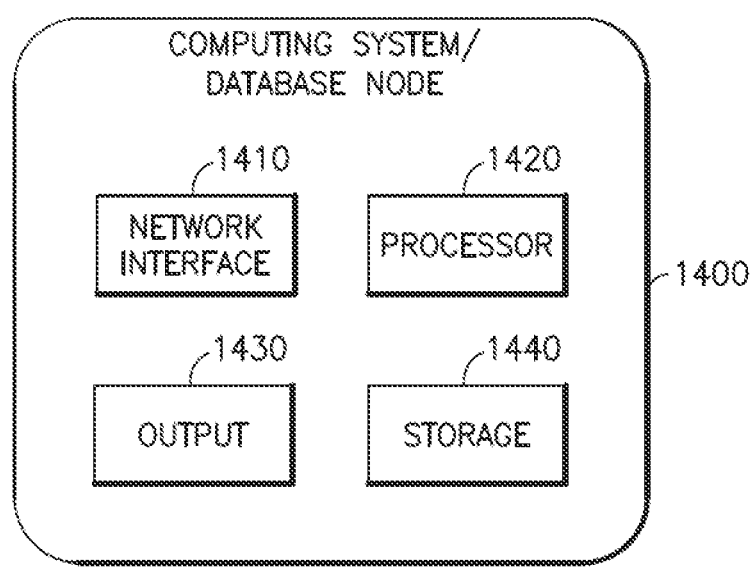
FIG. 14 is a block diagram of a system according to some embodiments.

FIG. 14 is a block diagram of apparatus 1400 according to some embodiments. Apparatus 1400 may comprise a general-purpose or special-purpose computing apparatus and may execute program code to perform any of the functions described herein. Apparatus 1400 may comprise an implementation of one or more elements of system 100. Apparatus 1400 may include additional elements which are not shown, according to some embodiments.

Apparatus 1400 includes processor 1420 operatively coupled to communication device 1420, data storage device/ memory 1430, one or more input devices (not shown), and one or more output devices 1430. The network interface 1410 may facilitate communication with external devices, such as an application server. Input device(s) may be implemented in the apparatus 1400 or in a client device connected via the network interface 1410. The input device(s) may comprise, for example, a keyboard, a keypad, a mouse or other pointing device, a microphone, knob or a switch, an infra-red (IR) port, a docking station, and/or a touch screen. Input device(s) may be used, for example, to manipulate graphical user interfaces and to input information into apparatus 1400. Output device(s) 1430 may comprise, for example, a display (e.g., a display screen) a speaker, and/or a printer.

Data storage device/memory 1440 may comprise any device, including combinations of magnetic storage devices (e.g., magnetic tape, hard disk drives and flash memory), optical storage devices, Read Only Memory (ROM) devices, Random Access Memory (RAM) etc.

The storage device 1440 stores a program and/or platform logic for controlling the processor 1420. The processor 1420 performs instructions of the programs and thereby operates in accordance with any of the embodiments described herein, including but not limited to the processes.

The programs may be stored in a compressed, uncompiled and/or encrypted format. The programs may furthermore include other program elements, such as an operating system, a database management system, and/or device drivers used by the processor 1420 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computing system comprising:
   a memory comprising a memory slice of a logical architecture, wherein the memory slice stores a plurality of documents; and
   a processor configured to:
   generate a document vector for the memory slice in the memory Which comprises a plurality of document pointers that point to a plurality of self-contained locations of the plurality of documents within the memory slice, respectively,
   backup a copy of the memory slice and a copy of the document vector in a backup storage device in response to a checkpoint operation, and
   restore, to the memory, the backup copy of the memory slice and the backup copy of the document vector with copies of the plurality of document pointers that were included in the document vector prior to the checkpointing, in response to a reload operation.

2. The computing system of claim 1, wherein each document pointer comprises an identifier of a segment from among a plurality of segments of the memory slice where a respective document is contained and a byte value that points to a starting location of the respective document within the segment.

3. The computing system of claim 1, wherein the processor is configured to generate the document vector via insertion a plurality of entries into the document vector corresponding to a plurality of documents in the memory slice, wherein each entry includes both a segment identifier and an offset value identifying a start of a location of a respective document among the plurality of documents in the memory slice.

4. The computing system of claim 1, wherein the processor is configured to receive a structured query language (SQL) query for a document from a software process, and in response, return a document pointer to the software process which includes a segment identifier of a segment of the memory slice that contains the document and an offset identifying a self-contained location of the document within the segment based on the document vector.

5. The computing system of claim 1, wherein the processor is configured to refill the document vector with the plurality of document pointers that were included in the document vector prior to the checkpointing, in response to the reload operation.

6. The computing system of claim 1, wherein the processor is configured to generate the plurality of document pointers, wherein each document pointer points to locations of a plurality of document headers of the plurality of documents, respectively, within the memory slice.

7. The computing system of claim 1, wherein the processor is configured to generate a set of document pointers for a set of documents in a same segment of the memory slice, wherein each document in the same segment is assigned a common segment identifier and a different offset value that specifies a different starting location of a respective document in the same segment.

8. The computing system of claim 1, wherein the processor is configured to store the document vector in a previously designated block of the backup copy of the memory slice and pull the document vector from the previously designated block during the reload operation.

9. A method comprising:
   storing a memory slice within a memory of a logical architecture, wherein the memory slice stores a plurality of documents;
   generating a document vector for the memory slice in the memory which comprises a plurality of document pointers that point to a plurality of self-contained locations of the plurality of documents within the memory slice, respectively;
   backing up a copy of the memory slice and a copy of the document vector in a backup storage device in response to a checkpoint operation; and
   restoring, to the memory, the backup copy of the memory slice and the backup copy of the document vector with copies of the plurality of document pointers that were included in the document vector prior to the checkpointing, in response to a reload operation.

10. The method of claim 9, wherein each document pointer comprises an identifier of a segment from among a plurality of segments of the memory slice where a respective document is contained and a byte value that points to a starting location of the respective document within the segment.

11. The method of claim 9, wherein the generating comprises generating the document vector by inserting a plurality of entries into the document vector corresponding to a plurality of documents in the memory slice, wherein each entry includes both a segment identifier and an offset value identifying a start of a location of a respective document among the plurality of documents in the memory slice.

12. The method of claim 9, wherein the method further comprises receiving a structured query language (SQL) query for a document from a software process, and in response, returning a document pointer to the software process which includes a segment identifier of a segment of the memory slice that contains the document and an offset identifying a self-contained location of the document within the segment based on the document vector.

13. The method of claim 9, wherein the reloading comprises refilling the document vector with the plurality of document pointers that were included in the document vector prior to the checkpointing, in response to the reload operation.

14. The method of claim 9, wherein the generating further comprises generating the plurality of document pointers, wherein each document pointer points to locations of a plurality of document headers of the plurality of documents, respectively, within the memory slice.

15. The method of claim 9, wherein the generating further comprises generating a set of document pointers for a set of documents in a same segment of the memory slice, wherein each document pointer in the same segment is assigned a common segment identifier and a different offset value that specifies a different starting location of a respective document in the same segment.

16. The method of claim 9, wherein the backing up comprises storing the document vector in a previously designated block of the backup copy of the memory slice, and the restoring comprises pulling the document vector from the previously designated block during the reload operation.

17. A non-transitory computer-readable medium comprising instructions which when read by a processor cause a computer to perform a method comprising:

storing a memory slice within a memory of a logical architecture, wherein the memory slice stores a plurality of documents;

generating a document vector for the memory slice in the memory which comprises a plurality of document pointers that point to a plurality of self-contained locations of the plurality of documents within the memory slice, respectively;

backing up a copy of the memory slice and a copy of the document vector in a backup storage device in response to a checkpoint operation; and restoring, to the memory, the backup copy of the memory slice and the backup copy of the document vector with copies of the plurality of document pointers that were included in the document vector prior to the checkpointing, in response to a reload operation.

18. The non-transitory computer-readable medium of claim 17, wherein the reloading comprises refilling the document vector with the plurality of document pointers that were included in the document vector prior to the checkpointing, in response to the reload operation.

19. The non-transitory computer-readable medium of claim 17, wherein the generating further comprises generating the plurality of document pointers, wherein each document pointer points to locations of a plurality of document headers of the plurality of documents, respectively, within the memory slice.

20. The non-transitory computer-readable medium of claim 17, wherein the generating further comprises generating a set of document pointers for a set of documents in a same segment of the memory slice, wherein each document pointer in the same segment is assigned a common segment identifier and a different offset value that specifies a different starting location of a respective document in the same segment.

* * * * *